Patented Jan. 5, 1943

2,307,485

UNITED STATES PATENT OFFICE 2,307,485

PORTLAND CEMENT COMPOSITIONS

Robert B. Booth, Springdale, Conn., assignor to American Cyanamid Company, New York, N. Y., a corporation of Maine No Drawing. Application March 20, 1941,
Serial No. 384,347

11 Claims. (Cl. 106—90)

This invention relates to Portland cements and more particularly it relates to Portland cements having improved plasticity and methods for their manufacture.

Portland cement in the raw state does not readily mix with water to form a plastic composition and frequently an amount of water larger than would otherwise be necessary for the chemical reaction involved in the setting of the cement is employed. This is a problem of considerable concern in the cement industry because this lack of plasticity makes the mixing of cement with water somewhat difficult and unless excessive amounts of water are employed, the cement mixtures or slurries do not have desirable flow characteristics and are otherwise difficult to handle. Furthermore, the use of an excessive amount of water required in mixing slurries of the untreated cement, frequently results in a set mixture having an unsatisfactory density and in many instances containing voids which result from shrinkage.

In accordance with the present invention, I have discovered that when a small amount of a sulphonated amino-hydroxy triphenyl-methane dye is mixed with Portland cement prior to and/or during the preparation of aqueous slurries of neat cement or Portland cement concrete mixes, the plasticity is very greatly improved. That is to say, the plasticity or flow characteristics of Portland cement slurries containing a fixed cement-water ratio can be improved by admixing therewith a small amount of a sulphonated amino-hydroxy triphenylmethane dye. The invention, therefore, may be employed either for reducing the amount of water while at the same time obtaining a readily flowable slurry, or using equivalent quantities of water to produce a slurry having very greatly improved flow characteristics.

The substances that I have found to be effective for the purposes of the present invention belong to the general class of sulphonated amino-hydroxy triphenylmethane dyes, particularly the water-soluble salts thereof. Representative dyes of this class are those such as the following, descriptions of which are found in the colour index.

*Disulphine Blue V or Patent Blue V* (C. I. 712)— which refers to the calcium, magnesium, or sodium salt of diethylamino-sulpho-m′ hydroxy fuchson-diethylimonium sulphonate.

*Cyanine B* (C. I. 713)—described as the oxidation product of Patent Blue V with chromic acid or ferric salts, whereby probably ethyl groups are eliminated with formation of aldehyde.

*Disulphine Blue A or Patent Blue A* (C. I. 714)—which is the calcium salt of benzylethylaminosulpho-m′ hydroxy-fuchson benzylethylimonium sulphonate.

*Xylene Cyanol FF* (C. I. 715)—which refers to the sodium salt of ethylamino sulpho-m′ hydroxy-dimethyl-fuchson ethylimonium sulphonate.

*Ketone Blue 4BN* (C. I. 716)—described as being composed of methyldiphenylamine and oxydimethylaminobenzophenone and sulphonate.

*Acid Violet 6B* (C. I. 717)—which is the sodium salt of dimethyl-p-tolyldiamino-disulpho-ethoxy-fuchson-dimethylimonium sulphonate.

While the above class of dyes generally show effectiveness in slump increases, they differ somewhat among themselves and I have found that Patent Blue A is the most effective and hence is the preferred material to be used in the present invention.

In carrying out the present invention the sulphonated amino-hydroxy triphenylmethane dye may be mixed with the cement clinker prior to and/or during grinding, it may be mixed with the dry Portland cement, or it may be added to the water or slurries employed in making up the neat cement or concrete mixtures. Similarly the sulphonated amino-hydroxy triphenylmethane dye may be added at various stages; for example, a small amount may be mixed with the cement clinker and/or the dry Portland cement, and then if desired, additional quantities added to the water used in making up the slurries. In any event, the fluidity and plasticity of the cement slurries are increased for any fixed cement-water ratio and permit the use of the smallest possible quantity of water necessary for reacting with and causing the cement to set while at the same time the fluidity is such that the slurries are easily mixed and handled. The resulting compositions set to produce a high density product and having strength comparable to and in most instances superior to those produced using ordinary Portland cement-water mixtures.

It will be apparent to those skilled in the art that the improved Portland cements of this invention containing a small amount of a sulphonated amino-hydroxy triphenylmethane dye may be used in Portland cement mixtures containing other substances affecting the properties of the Portland cement slurries and Portland cement compositions. For example, it is well known that certain substances have a set-retarding action on Portland cement mixtures. These set-retarding substances, therefore, may be employed with my improved cement compositions when it is desired to retard the setting action. A cement having improved plasticity and a retarded setting action in accordance with my invention can therefore be one comprising a mixture of dry Portland cement containing from about 0.005 to 0.05% of sulphonated amino-hydroxy triphenylmethane dye and a suitable quantity of a set-retarding substance such as hexametaphosphate. Similarly setting accelerating substances may be employed in conjunction with my improved compositions and a suitable composition having accelerated setting action when made into a neat cement slurry or a concrete slurry would be one comprising dry Portland cement containing about 0.005 to 0.05% of a sulphonated amino-hydroxy triphenylmethane dye and about 1% or more of a substance such as calcium chloride or other metal chloride, alkali aluminates, silicates, carbonates, or thiocyanates. Bentonite and similar substances are employed in Portland cements for special cementing operations. The compositions of this invention may be used with such products. For example, about 0.005 to 0.05% of a sulphonated amino-hydroxy triphenylmethane dye can be added to Portland cement containing about 2% of bentonite and a cement mix having increased fluidity obtained.

My invention will be more fully illustrated in conjunction with the following specific examples.

*Example 1*

A standard Portland cement mix containing 2041 parts of Portland cement and 6123 parts of clean sand (—8 mesh) and 1210 parts of water were used in making a series of tests: one in which 0.05% of Patent Blue A was incorporated with the dry Portland cement, and others using 0.002%, 0.003%, 0.004% and 0.005% respectively. A control sample of the same cement mix was also tested. The plasticity of the cement mixtures described above were measured by the standard slump test in which a cone of the various mixtures was employed and reduction in height, or the slump, measured. Compression strengths were also determined after seven days setting time and again after 28 days setting. The sample using 0.05% Patent Blue A showed a 500% increase in slump over the control sample. The compression strength at the end of 7 days was somewhat less than that of the control sample, and was slightly less than the control at the end of 28 days. When 0.002% of Patent Blue A was used, the percent increase in slump was 100% greater than the control and the compression strength was about 5% greater at the end of 7 days and about the same at the end of 28 days. When 0.003% of Patent Blue A was employed, the percent increase in slump was 100%. The compression strength was 8% greater at the end of 7 days and about the same at the end of 28 days. When 0.004% of Patent Blue A was used the percent increase in slump was 140% greater than the control; the compression strength at the end of 7 days was 6% greater and about the same at the end of 28 days. When 0.005% of Patent Blue A was used the increase in slump was about 200% and the compression strength was about 2% greater at the end of 7 days and was also greater at the end of 28 days.

Similar tests were carried out on neat cement mixtures, that is to say, dry Portland cement and water mixtures in which various quantities of Patent Blue A ranging from 0.05 to 0.005% based on the weight of the cement were used. In every instance the mixture showed an increased slump value over the control test using similar quantities of Portland cement and water. The greatest degree of plasticity appeared to be obtained when about 0.05% of Patent Blue A was employed. This larger quantity resulted in compositions showing a slight decrease in the final strength of the set mixtures while the slump was tremedously increased.

As pointed out heretofore, other materials may be added to the Portland cement—sulphonated amino-hydroxy triphenylmethane dye mixtures for various purposes, such as those for accelerating the setting time, retarding the setting time, water-proofing substances, coloring substances, strength-increasing substances, bentonite, clays, or any other material normally employed in cement mixtures.

It is also to be understood that the particular compositions and the procedure described above are presented for the purpose of illustration and that the compositions may be varied to a considerable extent to produce compositions having improved plasticity and still not depart from my invention.

What I claim is:

1. A Portland cement having admixed therewith a small amount of a sulphonated amino-hydroxy triphenylmethane dye.

2. A portland cement having admixed therewith from 0.005% to 0.05% of a sulphonated amino-hydroxy triphenylmethane dye.

3. A portland cement comprising a mixture of Portland cement, a sulphonated amino-hydroxy triphenylmethane dye and a set-accelerating substance.

4. A Portland cement comprising a mixture of Portland cement, a sulphonated amino-hydroxy triphenylmethane dye and a set-retarding substance.

5. A method of increasing the plasticity of a neat Portland cement mix which comprises adding thereto a small amount of a sulphonated amino-hydroxy triphenylmethane dye.

6. A method of increasing the plasticity of a neat Portland cement mix which comprises adding thereto from 0.005% to 0.05% of a sulphonated amino-hydroxy triphenylmethane dye.

7. A Portland cement having admixed therewith a small amount of the calcium salt of benzylethylaminosulpho - m' hydroxy - fuchson benzylethylimonium sulphonate.

8. A method of increasing the plasticity of a neat Portland cement mix which comprises adding thereto a small amount of the calcium salt of benzylethylaminosulpho - m' hydroxy - fuchson benzylethylimonium sulphonate.

9. A method of increasing the plasticity of a neat Portland cement mix which comprises adding thereto from 0.005% to 0.05% of the calcium salt of benzylethylaminosulpho-m' hydroxy-fuchson benzylethylimonium sulphonate.

10. A process of making concrete which comprises adding to Portland cement a sulphonated amino-hydroxy triphenylmethane dye in an amount such that a concrete mix made therefrom containing a definite water-cement ratio will have increased flow characteristics.

11. A process of making concrete which comprises adding to Portland cement the calcium salt of benzylethylaminosulpho-m' hydroxy-fuchson benzylethylimonium sulphonate in an amount such that a concrete mix made therefrom containing a definite water-cement ratio will have increased flow characteristics.

ROBERT B. BOOTH.